United States Patent
Graves et al.

(10) Patent No.: US 9,285,487 B2
(45) Date of Patent: Mar. 15, 2016

(54) SYSTEMS AND METHODS FOR ASSAYING AN ELUATE FOR TECHNETIUM AND MOLYBDENUM CONTENT

(71) Applicant: Mallinckrodt LLC, Hazelwood, MO (US)

(72) Inventors: Kevin B. Graves, Catawissa, MO (US); Bryan S. Petrofsky, St. Louis, MO (US); Sumit Verma, Chesterfield, MO (US)

(73) Assignee: MALLINCKRODT LLC, Hazelwood, MO (US)

( * ) Notice: Subject to any disclaimer, the term of this patent is extended or adjusted under 35 U.S.C. 154(b) by 0 days.

(21) Appl. No.: 14/524,196

(22) Filed: Oct. 27, 2014

(65) Prior Publication Data

US 2015/0060684 A1    Mar. 5, 2015

Related U.S. Application Data

(63) Continuation of application No. 13/800,248, filed on Mar. 13, 2013, now Pat. No. 8,872,124.

(51) Int. Cl.
| | |
|---|---|
| *H01J 47/00* | (2006.01) |
| *G01T 1/185* | (2006.01) |
| *G21F 5/015* | (2006.01) |
| *G01T 7/02* | (2006.01) |

(52) U.S. Cl.
CPC . *G01T 1/185* (2013.01); *G01T 7/02* (2013.01); *G21F 5/015* (2013.01)

(58) Field of Classification Search
CPC ........... G21F 5/015; B01J 2219/00707; G01N 2030/77; G01T 1/185; G01T 7/02
USPC ........................................................ 250/375
See application file for complete search history.

(56) References Cited

U.S. PATENT DOCUMENTS

| | | | |
|---|---|---|---|
| 2,538,632 A | | 1/1951 | Tompkins |
| 3,655,981 A | * | 4/1972 | Montgomery et al. . 250/432 PD |
| 3,710,118 A | * | 1/1973 | Holgate et al. ............ 250/432 R |
| 3,774,036 A | * | 11/1973 | Gerhart ......................... 252/645 |
| 4,020,351 A | | 4/1977 | Gemmill, Sr. et al. |
| 4,144,461 A | * | 3/1979 | Glasser et al. ............. 250/506.1 |

(Continued)

FOREIGN PATENT DOCUMENTS

WO    2008/045298 A2    4/2008

OTHER PUBLICATIONS

Prussin S G et al. "An Instrumented Shield System for Calibration of Technetium-99m" Journal of Nuclear Medicine, Sep. 1, 1995, vol. 23, No. 3, pp. 202-208, New York, NY.

*Primary Examiner* — David J Makiya
*Assistant Examiner* — Taeho Jo
(74) *Attorney, Agent, or Firm* — Marsh Fischmann & Breyfogle LLP

(57) ABSTRACT

A system for assaying an eluate for Technetium-99m and Molybdenum-99 content includes an inner ionization chamber including a well configured to receive the eluate, an outer ionization chamber concentric with the inner ionization chamber, and attenuating material positioned between the inner and outer ionization chambers. A computing device is configured to determine a Technetium-99m content of the eluate based on a first current measured in the inner ionization chamber, and determine a Molybdenum-99 content of the eluate based on at least a second current measured in the outer ionization chamber.

20 Claims, 3 Drawing Sheets

(56) References Cited

U.S. PATENT DOCUMENTS

| | | | |
|---|---|---|---|
| 4,158,700 A | 6/1979 | Karageozian | |
| 4,280,053 A | 7/1981 | Evans et al. | |
| 4,506,155 A * | 3/1985 | Suzuki et al. | 250/252.1 |
| 4,701,308 A | 10/1987 | Koehly et al. | |
| 4,782,231 A | 11/1988 | Svoboda et al. | |
| 5,274,239 A * | 12/1993 | Lane et al. | 250/370.01 |
| 6,723,288 B2 | 4/2004 | Devlin, Sr. et al. | |
| 7,700,926 B2 | 4/2010 | Tartaglia et al. | |
| 7,737,415 B2 | 6/2010 | Casale et al. | |
| 7,893,414 B2 | 2/2011 | Larsen et al. | |
| 8,431,909 B2 | 4/2013 | Horton et al. | |
| 8,872,124 B2 | 10/2014 | Graves et al. | |
| 2008/0187489 A1 | 8/2008 | Tomlison et al. | |
| 2011/0079108 A1 | 4/2011 | Lapi et al. | |

\* cited by examiner

SYSTEMS AND METHODS FOR ASSAYING AN ELUATE FOR TECHNETIUM AND MOLYBDENUM CONTENT

CROSS-REFERENCE TO RELATED APPLICATIONS

This patent application is a continuation of and claims priority to pending U.S. patent application Ser. No. 13/800,248 that is entitled "SYSTEMS AND METHODS FOR ASSAYING AN ELUATE FOR TECHNETIUM AND MOLYBDENUM CONTENT," that was filed on Mar. 13, 2013, and the entire disclosure of which is hereby incorporated by reference in its entirety herein.

FIELD

The field of the disclosure relates generally to detecting a radioactive content of an eluate, and more particularly, to assaying an eluate for Technetium and Molybdenum.

BACKGROUND

Technetium-99m ($^{99m}$Tc) is a radioisotope commonly used for diagnostic medical purposes, and is produced using a Technetium generator and Molybdenum-99 ($^{99}$Mo). Eluates produced by the Technetium generator include not only Technetium-99m, but also small quantities of Molybdenum-99, which is a contaminant. Accordingly, eluates from Technetium generators are tested (i.e., assayed) for Molybdenum-99 content. For example, the U.S. Pharmacopeial Convention (USP) requires that an eluate from a Technetium generator should be tested and should not contain more than 0.15 microcuries of Molybdenum-99 per millicuries of Technetium-99m per administered dose.

Conventional assaying methods require performing a Technetium-99m assay using a first radiometric assay device, and subsequently transporting the eluate to a different location to perform a separate Molybdenum-99 assay using a second radiometric assay device. Further, in conventional assaying methods, a technician measures the eluate using a single channel analyzer and manually enters the measured data into a spreadsheet. Also, technicians transporting the eluate are exposed to the eluate during the process. Accordingly, known methods for assaying an eluate for Technetium-99m and Molybdenum-99 are time-consuming, inefficient and expose the technician to a radioactive dose.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a system for assaying an eluate for Technetium-99m and Molybdenum-99 content includes an inner ionization chamber including a well configured to receive the eluate, an outer ionization chamber concentric with the inner ionization chamber, and attenuating material positioned between the inner and outer ionization chambers. A computing device is configured to determine a Technetium-99m content of the eluate based on a first current measured in the inner ionization chamber, and determine a Molybdenum-99 content of the eluate based at least on a second current measured in the outer ionization chamber.

In another aspect, a method for assaying an eluate for Technetium-99m and Molybdenum-99 content includes placing the eluate in a well of an inner ionization chamber, measuring a first current in the inner ionization chamber, and measuring a second current in an outer ionization chamber, wherein the outer ionization chamber is concentric with the inner ionization chamber and separated from the inner ionization chamber by attenuating material. The method further includes determining, using a computing device, a Technetium-99m content of the eluate from the first measured current, and determining, using the computing device, a Molybdenum-99 content of the eluate from at least the second measured current.

In yet another aspect, a radiation detection device for detecting a plurality of radioactive isotopes in an eluate includes an inner ionization chamber including a well that receives the eluate, wherein a first current is generated in the inner ionization chamber in response to a first radioactive isotope present in the eluate. The radiation detection device further includes an outer ionization chamber concentric with the inner ionization chamber, wherein a second current is generated in the outer ionization chamber in response to a second radioactive isotope present in the eluate, and attenuating material positioned between the inner and outer ionization chambers.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

Figure 1:
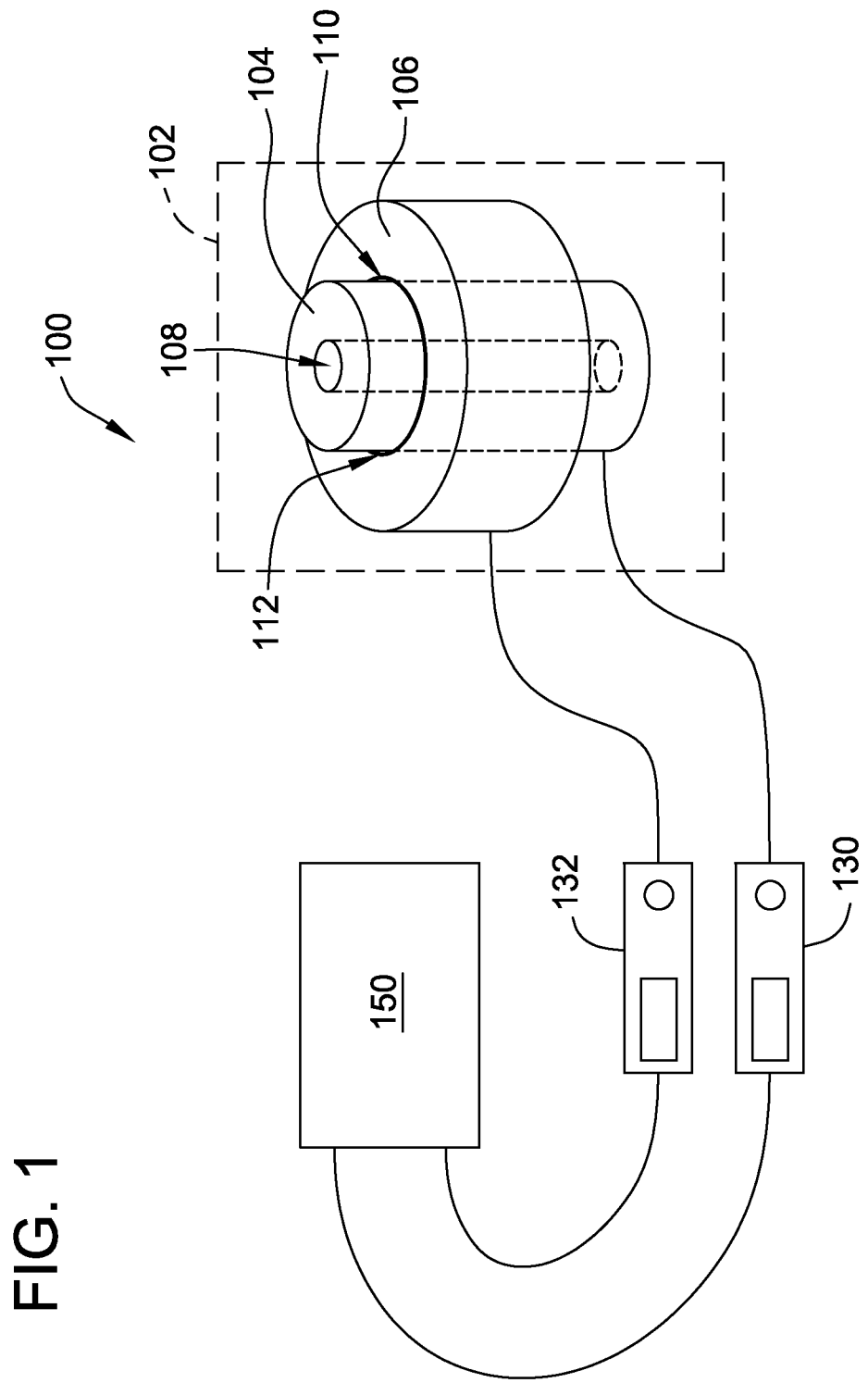
FIG. 1 is a schematic diagram of a system of one embodiment for assaying an eluate.
Figure 2:
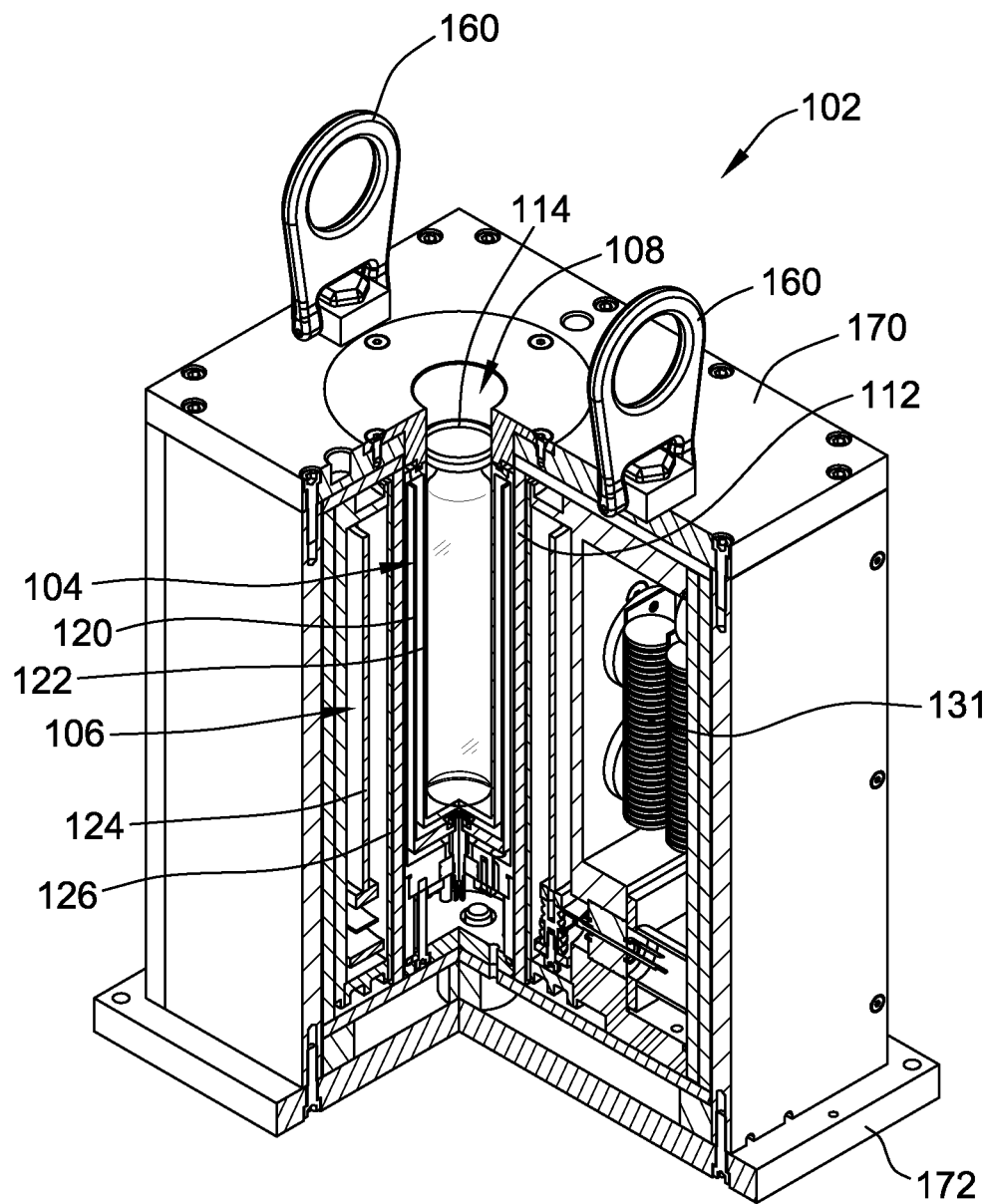
FIG. 2 is a perspective partial cut-away view of a radiation detection device that may be used with the system shown in FIG. 1.

Referring to FIG. 1, a system for assaying an eluate is indicated generally at 100. FIG. 2 is a perspective partial cut-away view of a radiation detection device 102 that may be used with the system shown in FIG. 1. System 100 includes a radiation detection device 102 having a first, inner ionization chamber 104 and a second, outer ionization chamber 106. First and second ionization chambers 104 and 106 are both annular and are concentric with one another. Each of first and second ionization chambers 104 and 106 contains a gas to facilitate detecting a radioactive content of an eluate, as described in more detail below.

First ionization chamber 104 includes a first well 108, and second ionization chamber includes a second well 110. Further, first and second ionization chambers 104 and 106 are concentric with one another, such that the first ionization chamber 104 is positioned within second well 110. An attenuating material 112 is positioned in second well 110 between the first ionization chamber 104 and second ionization chamber 106. Attenuating material 112 filters out low energy gamma rays emitted from the eluate, and may be, for example, lead or tungsten. In this embodiment, attenuating material 112 has a thickness of approximately 0.25 inches. Alternatively, attenuating material 112 may have any suitable dimensions for filtering out low energy gamma rays, as described herein.

To assay an eluate, a vial 114 or other container storing the eluate therein is inserted into first well 108. Vial 114 may be, for example, a 20 milliliter (ml) vial. In this embodiment, the eluate is produced using a Technetium generator (not shown). For example, the eluate may be produced by eluting a Technetium generator column with 10 milliliters (ml) of saline using a 20 ml evacuated vial. Accordingly, the eluate includes Technetium-99m and a relatively small amount of Molybdenum-99. In this embodiment, first ionization chamber 104 facilitates detecting a Technetium-99m ($^{99m}$Tc) content of the eluate, and second ionization chamber 106 facilitates detecting a Molybdenum-99 ($^{99}$Mo) content of the eluate. After assaying the eluate, the eluate may be disposed of using a radioactive waste system (not shown).

More specifically, first and second ionization chambers 104 and 106 each contain a gas, a positive electrode, and a negative electrode. First ionization chamber 104 includes an outer electrode 120 and an inner electrode 122, and second ionization chamber 106 includes an outer electrode 124 and an inner electrode 126. Within each of first and second ionization chambers 104, one electrode operates as the positive electrode and one electrode operates as the negative electrode. Specifically, in each of first and second ionization chambers 104 and 106, a voltage is applied between the positive and negative electrodes to create an electric field in the gas. For example, relative to the negative electrode, a voltage of several hundred volts may be applied to the positive electrode. In this embodiment, the voltage difference between the positive and negative electrodes in first and second ionization chambers 104 and 106 is applied using Lithium-ion batteries 131 positioned within radiation detection device. Other power sources may also be used. Radiation emitted from the eluate ionizes the gas, and the generated ions move in response to the electric field, consequently generating a current in the respective ionization chamber. The amount of radiation corresponds to the amount of ionization, and accordingly, the amount of current. Accordingly, by detecting a first current in first ionization chamber 104 and a second current in second ionization chamber 106, the radioactive content of the eluate can be determined.

In this embodiment, first ionization chamber 104 includes gas such as Argon. With vial 114 positioned in first well 108, radiation from the Technetium-99m in the eluate ionizes the gas in first ionization chamber 104, generating the first current in first ionization chamber 104. A first current measurement device 130 communicatively coupled to first ionization chamber 104 measures the first current. In this embodiment, first current measurement device 130 is a source measurement unit (SMU). The SMU may be, for example, a Keithley® Sub-Femptoamp Remote Source Meter (Keithley is a registered trademark of Keithley Instruments, Inc., Cleveland, Ohio). Alternatively, first current measurement device 130 may be any device capable of measuring the first current in first ionization chamber 104.

First ionization chamber 104 has a lower sensitivity than the second ionization chamber 106. Accordingly, while first ionization chamber 104 may detect an elevated level of Molybdenum-99, lower levels of Molybdenum-99 may not be detected by first ionization chamber 104. Even if Molybdenum-99 content is detected by first ionization chamber 104, any detected amount is substantially insignificant relative to the amount of Technetium-99m detected.

As described above, first and second ionization chambers 104 and 106 are separated by attenuating material 112 that filters out low energy gamma rays. Accordingly, the majority of gamma rays (i.e., 142.63 kiloelectron volts (keV) emissions and 140.51 keV emissions) emitted from the Technetium-99m reach first ionization chamber 104, but are blocked by attenuating material 112, and do not reach second ionization chamber 106. However, as they have sufficiently high energy, 322.41 keV emissions from the Technetium-99m do reach second ionization chamber 106.

Second ionization chamber 106 is a high-pressure Xenon gas chamber in this embodiment. Using Xenon gas in second ionization chamber 106 facilitates increased sensitivity to radiation emitted from the Molybdenum-99 in the eluate. Accordingly, with vial 114 positioned in first well 108, radiation from the Molybdenum-99 in the eluate ionizes the gas in second ionization chamber 106, generating the second current in second ionization chamber 106. Because of the increased sensitivity, second ionization chamber 106 is also sensitive to 322.41 keV emissions from the Technetium-99m. As such, a portion of the second current generated in second ionization chamber 106 is due to the 322.41 keV emissions, and not emissions from the Molybdenum-99. This can be accounted for by correcting the determined the Molybdenum-99 content, as described in more detail below.

A second current measurement device 132 communicatively coupled to second ionization chamber 106 measures the second current. In this embodiment, second current measurement device 132 is a source measurement unit (SMU). The SMU may be, for example, a Keithley® Sub-Femptoamp Remote Source Meter (Keithley is a registered trademark of Keithley Instruments, Inc., Cleveland, Ohio). Alternatively, second current measurement device 132 may be any device capable of measuring the second current in second ionization chamber 106.

In this embodiment, a computing device 150 is communicatively coupled to first and second current measurement devices 130 and 132. Computing device 150 receives the first current measurement and the second current measurement from first and second current measurement devices 130 and 132, respectively.

Radiation detection device 102 includes a pair of lifting eyes 160 in this embodiment. As radiation detection device 102 may be relatively heavy (e.g., greater than 60 lbs), lifting eyes 160 aid in lifting and transporting radiation detection device 102. Radiation detection device 102 also includes a top radiation shielding member 170 and a bottom radiation shielding member 172. Top and bottom radiation shielding members 170 and 172 may be made of any suitable radiation shielding material (e.g., tungsten, lead etc.).

Figure 3:
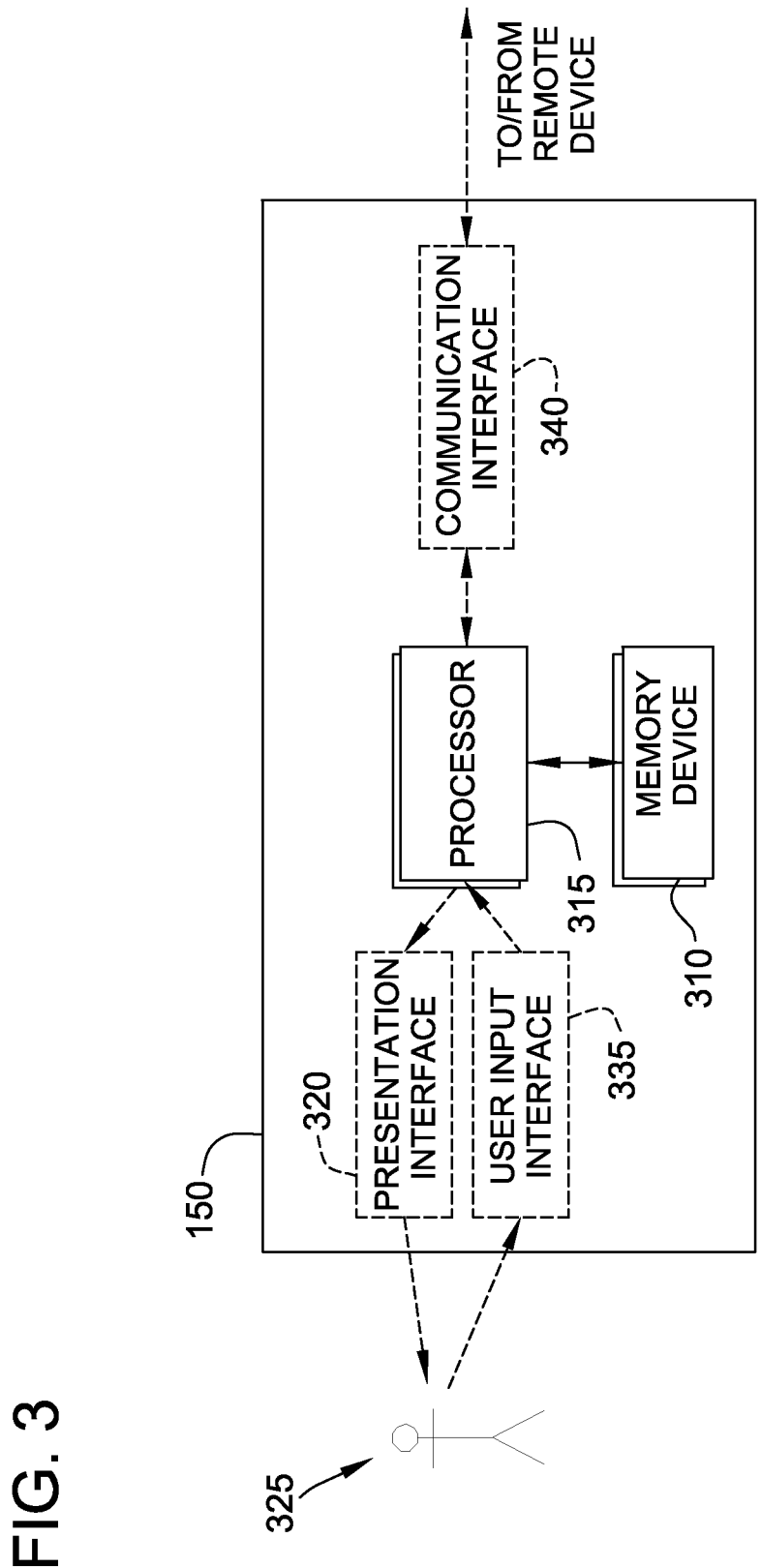
FIG. 3 is a block diagram of a computing device that may be used with the system shown in FIG. 1.

FIG. 3 is a block diagram of computing device 150. Computing device 150 includes at least one memory device 310 and a processor 315 that is coupled to memory device 310 for executing instructions. In this embodiment, executable instructions are stored in memory device 310, and computing device 150 performs one or more operations described herein by programming processor 315. For example, processor 315 may be programmed by encoding an operation as one or more executable instructions and by providing the executable instructions in memory device 310.

Processor 315 may include one or more processing units (e.g., in a multi-core configuration). Further, processor 315 may be implemented using one or more heterogeneous processor systems in which a main processor is present with secondary processors on a single chip. As another illustrative example, processor 315 may be a symmetric multi-processor system containing multiple processors of the same type. Further, processor 315 may be implemented using any suitable programmable circuit including one or more systems and microcontrollers, microprocessors, programmable logic controllers (PLCs), reduced instruction set circuits (RISC), application specific integrated circuits (ASIC), programmable logic circuits, field programmable gate arrays (FPGA), and any other circuit capable of executing the functions described herein. In this embodiment, processor 315 determines the Technetium-99m content and the Molybdenum-99 content of the eluate from the first and second current measurements, respectively, as described herein. Processor 315 may also control operation of first and second current measurement devices 130 and 132.

Memory device 310 is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data.

In this embodiment, computing device 150 includes a presentation interface 320 that is coupled to processor 315. Presentation interface 320 presents information, such as application source code and/or execution events, to a user 325, such as a technician. For example, presentation interface 320 may include a display adapter (not shown) that may be coupled to a display device, such as a cathode ray tube (CRT), a liquid crystal display (LCD), an organic LED (OLED) display, and/or an "electronic ink" display. Presentation interface 320 may include one or more display devices. In this embodiment, presentation interface 320 displays the determined Technetium-99m content and Molybdenum-99 content of the eluate.

Computing device 150 includes a user input interface 335 in this embodiment. User input interface 335 is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335. In this embodiment, computing device 150 further includes a communication interface 340 coupled to processor 315. Communication interface 340 communicates with one or more remote devices, such as first and second current measurement devices 130 and 132.

In this embodiment, computing device 150 (and more specifically, processor 315) receives the first current measurement from first current measurement device 130. Using a conversion factor (stored, for example, in memory device 310), processor 315 converts the first current measurement into a corresponding Technetium-99m content. In this embodiment, the Technetium-99m content is calculated in millicuries (mCi). Alternatively, the Technetium-99m content may be calculated in any suitable units.

Computing device 150 (and more specifically, processor 315) also receives the second current measurement from second current measurement device 130. Using a conversion factor (stored, for example, in memory device 310), processor 315 converts the second current measurement into a corresponding Molybdenum-99 content. In this embodiment, the Molybdenum-99 content is calculated in microcuries (µCi). Alternatively, the Molybdenum-99 content may be calculated in any suitable units. The conversion factors for calculating the Technetium-99m content and the Molybdenum-99 content may be obtained, for example, during a calibration process for system 100.

Processor 315 may also calculate and/or display other values related to the determined Technetium-99m and Molybdenum-99 content of the eluate. For example, processor 315 may calculate a generator yield for the Technetium generator used to produce the eluate, or may calculate a ratio of the Molybdenum-99 content to the Technetium-99m content. Further, any values calculated by processor 315 may be stored in memory device 310 and/or displayed on presentation interface 320.

As explained above, the determined Molybdenum-99 content can be corrected by accounting for 322.41 keV emissions from the Technetium-99m. More specifically, during calibration of system 100, a correction factor may be determined that represents the percentage of the Technetium-99m content attributable to 322.41 keV emissions. Notably, the percentage of Technetium-99m content attributable to 322.41 keV emissions is linear over a range of assay values. Accordingly, once the correction factor is determined, it can be applied to all assay values.

Using the correction factor, the determined Molybdenum-99 content can be corrected. For example, if the correction factor is determined (from calibration) to be 0.0014975, and the detected Technetium-99m content is 2357 mCi, the portion of the detected Technetium-99m content due to 322.41 keV emissions is 3.53 µCi (i.e., 2357 mCi×0.0014975=3.53 µCi). Accordingly, assuming the 322.41 keV emissions are detected in both the first and second ionization chambers 104 and 106, in the example, 3.53 µCi of the determined Molybdenum-99 content is due to the 322.41 keV emissions. By subtracting the portion from the detected Molybdenum-99 content, a corrected Molybdenum-99 content is calculated. In the example, if the detected Molybdenum-99 content is 7.2 µCi, the corrected Molybdenum-99 content is 3.67 µCi (i.e., 7.2 µCi−3.53 µCi=3.67 µCi). In this embodiment, processor 315 performs the calculations associated with correcting the determined Molybdenum-99 content. Further, the corrected Molybdenum-99 content may be displayed on presentation interface 320 instead of or in addition to the determined Molybdenum-99 content.

Using concentric ionization chambers 104 and 106, system 100 is capable of assaying an eluate for Technetium-99m content and Molybdenum-99 content simultaneously, significantly reducing the time required to assay the eluate from methods in which assays for Technetium-99m content and Molybdenum-99 content are performed sequentially. Further, using computing device 150, system 100 automatically collects and processes data related to the Technetium-99m content and Molybdenum-99 content of the eluate. As radiation detection device 102 facilitates detecting the content of both Technetium-99m and Molybdenum-99, system reduces handling of and exposure to the eluate by technicians. Moreover, as radiation detection device 102 includes attenuating material 112, unlike some known radiation detection devices, device 102 does not require external lead shielding. However, radiation detection device 102 may include built-in shielding to protect second ionization chamber 106 from external, background radiation.

Exemplary embodiments of a system for assaying an eluate are described above in detail. The system is not limited to the specific embodiments described herein, but rather, components of the system may be used independently and separately from other components described herein. For example, the radiation detection device described herein may also be used in combination with other systems and methods, and is not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. An assaying system, comprising:
    a housing;
    a well within said housing;
    a first ionization chamber within said housing and comprising a first gas;
    a second ionization chamber within said housing and comprising a second gas;
    an attenuating material positioned between said first and second ionization chambers, wherein said first ionization chamber, said attenuating material, and said second ionization chamber are positioned relative to one another such that when an eluate is positioned within said well and emits first and second radiation: 1) the first radiation reaches said first ionization chamber but is blocked from reaching said second ionization chamber by said attenuating material; and 2) the second radiation passes through said attenuating material and reaches said second ionization chamber; and
    a computing device configured to: 1) determine a first radioisotope content based on a first current associated with said first ionization chamber; and 2) determine a second radioisotope content based at least on a second current associated with said second ionization chamber.

2. The assaying system of claim 1, further comprising a container disposed within said well, wherein said container comprises an eluate.

3. The assaying system of claim 2, wherein said first radioisotope comprises Technetium-99m within said eluate and said second radioisotope comprises Molybdenum-99 within said eluate.

4. The assaying system of claim 1, wherein each of said first ionization chamber and said second ionization chamber are annular.

5. The assaying system of claim 4, wherein said first ionization chamber is disposed inwardly of said second ionization chamber.

6. The assaying system of claim 1, wherein said second ionization chamber is concentric with said first ionization chamber.

7. The assaying system of claim 6, wherein said first ionization chamber is disposed inwardly of said second ionization chamber.

8. The assaying system of claim 1, wherein said first gas within said first ionization chamber is Argon and said second gas within said second ionization chamber is Xenon.

9. The assaying system of claim 1, wherein said attenuating material filters gamma rays.

10. The assaying system of claim 1, wherein each of said first and second ionization chambers comprise a positive electrode and a negative electrode.

11. The assaying system of claim 1, further comprising:
    a first current measurement device communicatively coupled to said first ionization chamber; and
    a second current measurement device communicatively coupled to said second ionization chamber.

12. The assaying system of claim 11, wherein said computing device receives current measurements from each of said first and second current measurement devices.

13. The assaying system of claim 1, wherein said first radioisotope content and said second radioisotope content of an eluate positioned within said well are simultaneously determined by said assaying system.

14. The assaying system of claim 1, wherein said computing device comprises a first conversion factor for converting said first current into said first radioisotope content, and a second conversion factor for converting said second current into an initial second radioisotope content.

15. The assaying system of claim 14, wherein said computing device further comprises a first correction factor, wherein said first correction factor accounts for emissions of a first radioisotope that is reflected in each of said first and second currents.

16. The assaying system of claim 1, wherein said computing device further comprises a first correction factor, and wherein said first correction factor accounts for emissions of a first radioisotope that is reflected in each of said first and second currents.

17. The assaying system of claim 16, wherein said computing device determines an initial second radioisotope content from said second current, and wherein said computing device determines said second radioisotope content from each of said initial second radioisotope content and said first correction factor.

18. The assaying system of claim 16, wherein said computing device determines an initial second radioisotope content from said second current, and wherein said computing device determines said second radioisotope content by multiplying said initial second radioisotope content by said first correction factor to yield a correction value, and then subtracting said correction value from said initial second radioisotope content.

19. A method of assaying an eluate for first and second radioisotopes, comprising:
    measuring a first current in a first ionization chamber that is generated using first radiation emitted by an eluate and a first gas within said first ionization chamber;
    blocking said first radiation from reaching a second ionization chamber, wherein said blocking comprises using an attenuating material disposed between said first ionization chamber and a second ionization chamber;
    allowing second radiation from said eluate to reach said second ionization chamber by passing through said attenuating material;
    measuring a second current in said second ionization chamber that is generated using said second radiation emitted by said eluate and a second gas within said second ionization chamber;
    determining a first radioisotope content in said eluate using said first current; and
    determining a second radioisotope content in said eluate using said second current.

20. The method of claim 19, further comprising:
creating a first electric field within said first ionization chamber;
creating a second electric field within said second ionization chamber;
ionizing said first gas in said first ionization chamber using said first radiation;
ionizing said second gas in said second ionization chamber using said second radiation;
moving ionized first gas within said first ionization chamber, in response to said first electric field, to create said first current; and
moving ionized second gas within said second ionization chamber, in response to said second electric field, to create said second current.

* * * * *